(12) United States Patent
Escande

(10) Patent No.: US 9,370,990 B2
(45) Date of Patent: Jun. 21, 2016

(54) METHOD AND SYSTEM FOR MOUNTING OR REMOVING A MOTOR VEHICLE BATTERY

(75) Inventor: Bruno Escande, Septeuil (FR)

(73) Assignee: RENAULT S.A.S., Boulogne Billancourt (FR)

( * ) Notice: Subject to any disclaimer, the term of this patent is extended or adjusted under 35 U.S.C. 154(b) by 487 days.

(21) Appl. No.: 13/517,997

(22) PCT Filed: Dec. 13, 2010

(86) PCT No.: PCT/FR2010/052678
§ 371 (c)(1),
(2), (4) Date: Aug. 3, 2012

(87) PCT Pub. No.: WO2011/083229
PCT Pub. Date: Jul. 14, 2011

(65) Prior Publication Data
US 2012/0291250 A1    Nov. 22, 2012

(30) Foreign Application Priority Data
Dec. 21, 2009  (FR) .................................. 09 59270

(51) Int. Cl.
*B29C 73/00*    (2006.01)
*B23P 19/04*    (2006.01)
(Continued)

(52) U.S. Cl.
CPC .............. *B60K 1/04* (2013.01); *B60L 11/1822* (2013.01); *B60L 11/1877* (2013.01); *H01M 2/1083* (2013.01); *Y02T 10/7005* (2013.01); *Y02T 10/705* (2013.01); *Y02T 10/7072* (2013.01);
(Continued)

(58) Field of Classification Search
CPC ... B60K 1/04; H01M 2/1083; B60L 11/1822; B60L 11/1877; Y10T 29/49822; Y10T 29/53; Y10T 29/4973; Y10T 29/49945; Y02T 10/705; Y02T 10/7005; Y02T 90/14; Y02T 90/124; Y02T 10/7072
USPC ................. 29/402.01, 402.03, 402.08, 426.1, 29/426.2, 426.5, 525, 700; 700/245, 258
See application file for complete search history.

(56) References Cited

U.S. PATENT DOCUMENTS 1,392,757 A  * 10/1921  Gales ........................... 180/68.5
3,169,293 A  *  2/1965  Neuschotz .............. F16B 21/04
                                                                411/552
(Continued)

FOREIGN PATENT DOCUMENTS

GB          515 707       12/1939
WO      2008 128991       10/2008

OTHER PUBLICATIONS

French Search Report Issued Jul. 1, 2010 in FR 09 59270 Filed Dec. 21, 2009.

(Continued)

*Primary Examiner* — Essama Omgba
*Assistant Examiner* — Darrell C Ford
(74) *Attorney, Agent, or Firm* — Oblon, McClelland, Maier & Neustadt, L.L.P.

(57) ABSTRACT

A method for mounting or removing a power supply container of a drive motor of a motor vehicle that is secured to the motor vehicle using a bolt acted on by a piston. The method includes: acting on the piston to move the pistons relative to the bolt so as to disengage the bolt; and rotating the bolt such as to lock or unlock the bolt and lock or unlock the battery.

15 Claims, 3 Drawing Sheets

(51) Int. Cl.

| | | |
|---|---|---|
| *B23P 23/00* | (2006.01) | |
| *B23P 19/00* | (2006.01) | |
| *B23P 19/02* | (2006.01) | |
| *B60K 1/04* | (2006.01) | |
| *B60L 11/18* | (2006.01) | |
| *H01M 2/10* | (2006.01) | |

(52) U.S. Cl.
 CPC ............... *Y02T 90/124* (2013.01); *Y02T 90/14* (2013.01); *Y10T 29/4973* (2015.01); *Y10T 29/49822* (2015.01); *Y10T 29/49945* (2015.01); *Y10T 29/53* (2015.01)

(56) References Cited

U.S. PATENT DOCUMENTS

| | | | | |
|---|---|---|---|---|
| 3,661,051 | A * | 5/1972 | Dunne et al. ................... | 700/245 |
| 4,450,400 | A * | 5/1984 | Gwyn ........................... | 320/109 |
| 4,511,637 | A * | 4/1985 | Evans ........................... | 429/100 |
| 4,894,755 | A * | 1/1990 | Chandler ............. | B60Q 1/2692 340/472 |
| 4,983,903 | A * | 1/1991 | Bae et al. ...................... | 320/128 |
| 5,373,910 | A * | 12/1994 | Nixon .......................... | 180/65.1 |
| 5,711,648 | A * | 1/1998 | Hammerslag ................. | 414/800 |
| 5,998,963 | A * | 12/1999 | Aarseth ......................... | 320/109 |
| 6,059,058 | A * | 5/2000 | Dower ..................... | B60K 1/04 180/298 |
| 6,094,028 | A * | 7/2000 | Gu et al. ....................... | 320/109 |
| 6,170,304 | B1 * | 1/2001 | Ohta ......................... | E05B 67/36 70/14 |
| 6,267,543 | B1 * | 7/2001 | David ..................... | F16B 21/02 411/549 |
| 6,347,679 | B1 * | 2/2002 | Dignitti et al. ............... | 180/68.5 |
| 6,508,322 | B2 * | 1/2003 | Dignitti .................. | B60R 16/04 180/65.1 |
| 6,659,513 | B1 * | 12/2003 | Ramsauer .......... | E05B 17/0025 292/64 |
| 6,732,976 | B2 * | 5/2004 | Hessling ................ | B64C 1/066 244/119 |
| 7,401,995 | B2 * | 7/2008 | Senakiewich, II ......... | 403/374.4 |
| 8,013,571 | B2 * | 9/2011 | Agassi et al. ................. | 320/109 |
| 8,164,300 | B2 * | 4/2012 | Agassi et al. ................. | 320/104 |
| 8,347,995 | B2 * | 1/2013 | Fernandez-Mateo ........ | 180/68.5 |
| 8,491,246 | B2 * | 7/2013 | Chao et al. .................... | 411/349 |
| 8,858,152 | B1 * | 10/2014 | McDaniel ..................... | 414/809 |
| 8,893,838 | B2 * | 11/2014 | Ichikawa ...................... | 180/68.5 |
| 2007/0108877 | A1 | 5/2007 | Bergmann et al. | |
| 2009/0058355 | A1 * | 3/2009 | Meyer ........................... | 320/104 |
| 2009/0074539 | A1 * | 3/2009 | Mahdavi ....................... | 411/533 |
| 2010/0145717 | A1 * | 6/2010 | Hoeltzel ........................ | 705/1.1 |
| 2011/0113609 | A1 * | 5/2011 | Berdelle-Hilge et al. ... | 29/426.1 |
| 2011/0198137 | A1 * | 8/2011 | De Paschoal ................. | 180/65.1 |
| 2012/0040219 | A1 * | 2/2012 | Cappellotti et al. ........... | 429/99 |
| 2012/0076569 | A1 * | 3/2012 | Ecochard ........................ | 403/33 |
| 2012/0110831 | A1 | 5/2012 | Escande | |
| 2012/0240387 | A1 * | 9/2012 | Lombarte ..................... | 29/592.1 |
| 2012/0240730 | A1 * | 9/2012 | Escande et al. ................. | 81/54 |
| 2012/0255800 | A1 * | 10/2012 | Lejeune et al. .............. | 180/68.5 |
| 2012/0326107 | A1 * | 12/2012 | Ojima et al. ................. | 254/89 R |
| 2013/0031776 | A1 * | 2/2013 | Escande et al. ................ | 29/729 |
| 2013/0180791 | A1 * | 7/2013 | Lejeune et al. .............. | 180/68.5 |
| 2013/0226345 | A1 * | 8/2013 | Zhao et al. .................... | 700/258 |
| 2013/0249470 | A1 * | 9/2013 | Martin et al. ................. | 320/107 |
| 2013/0337308 | A1 * | 12/2013 | Rathmacher .................. | 429/100 |
| 2014/0165354 | A1 * | 6/2014 | Ojima et al. .................. | 29/281.1 |

OTHER PUBLICATIONS

International Search Report Issued Apr. 21, 2011 in PCT/FR10/52678 Filed Dec. 13, 2010.

U.S. Appl. No. 13/514,078, filed Jun. 6, 2012, Escande, et al.

* cited by examiner

METHOD AND SYSTEM FOR MOUNTING OR REMOVING A MOTOR VEHICLE BATTERY

BACKGROUND

The present invention relates to a method for mounting or removing, for example in order to recharge and/or replace it, a container of energy that powers an engine or motor that propels a motor vehicle. It also relates to a mounting or removal system and to an energy-container exchange station implementing such a method.

Certain motor vehicles, such as electric or hybrid vehicles, comprise a container of energy that powers a propulsion engine or motor, such as an electric battery that powers an electric motor. It may prove advantageous to exchange this container, when its level of energy is low, for a new container which is full of energy. This can be done in a station similar to a service station in which a motor vehicle can have its tank filled with gasoline.

Document U.S. Pat. No. 5,612,606 discloses a station for exchanging the electric battery that powers a motor that propels an electric vehicle and a method for performing such an exchange. In the exchange station described, the driver positions the vehicle approximately in a rail, against a longitudinal end stop with respect to equipment belonging to the station. After that, in phases that are fairly automatic, mobile means for removing the electric battery and for assembling the new battery in the vehicle position themselves relative to the vehicle using sensors. The number of sensors and electronic means required for the operation of such a station makes it not very reliable and means that it cannot operate very robustly.

To make it easy to roll out energy container exchange stations (requiring little by way of technological competence), it is necessary to offer an energy container exchange system that is reliable and robust, and therefore a method for mounting or removing energy containers that works well.

BRIEF SUMMARY

Thus, it is an object of the invention to provide a solution for mounting or removing an energy container that addresses the disadvantages mentioned hereinabove and improves the replacement methods known from the prior art.

In particular, the invention proposes a method for mounting or removing an energy container that is simple, reliable and automated.

To this end, the invention relies upon a method for mounting or removing a container of energy that powers an engine or motor that propels a motor vehicle, fixed to the motor vehicle using a lock on which a piston acts, characterized in that it comprises the following steps:

(E1): acting on the piston to cause it to move in relation to the lock in order to disengage the latter;
(E2): turning the lock to lock or unlock it and lock or unlock the battery.

The first step (E1) may consist in pushing the piston in order to move it translationally against an elastic means.

The second step (E2) may consist in rotating the lock by half a turn or less.

The second step (E2) may be obtained by associating a connecting means of a tool with a connecting means of one end of the lock.

The method may comprise a prior step (E0) of fixing a tool for implementing the method to at least one corresponding element of the vehicle body shell, of the battery or of the lock.

The prior step (E0) may comprise connecting the tool via at least two connecting elements which are distributed symmetrically about a connecting means of the lock.

The prior step (E0) may comprise inserting a mushroom-shaped element into a corresponding slot.

The steps of actuating the lock may be performed automatically using a motorized tool.

The invention also relates to a method for replacing a container of energy that powers an engine or motor that propels a motor vehicle, characterized in that it comprises a method for mounting or removing the power supply energy container as described hereinabove.

The invention also relates to a system for mounting or removing a container of energy that powers an engine or motor that propels a motor vehicle, characterized in that it comprises hardware and/or software means for implementing the mounting or removal method as described hereinabove.

The invention also relates to a station for mounting or removing a container of energy that powers an engine or motor that propels a motor vehicle, characterized in that it comprises a mounting or removal system as described above.

BRIEF DESCRIPTION OF THE DRAWINGS

These objects, features and advantages of the present invention will be explained in detail in the following description of one particular embodiment given by way of nonlimiting example with reference to the attached figures in which.

DETAILED DESCRIPTION

The invention applies to any vehicle comprising a power supply energy container positioned in the rear luggage compartment or under the chassis. The remainder of the description describes the removal of an energy container by describing the removal of a battery that supplies electrical power to a motor that propels a vehicle. However, the invention applies to any type of power supply container and also applies to the mounting of a power supply battery, by performing the steps described hereinbelow in reverse.

Figure 1:
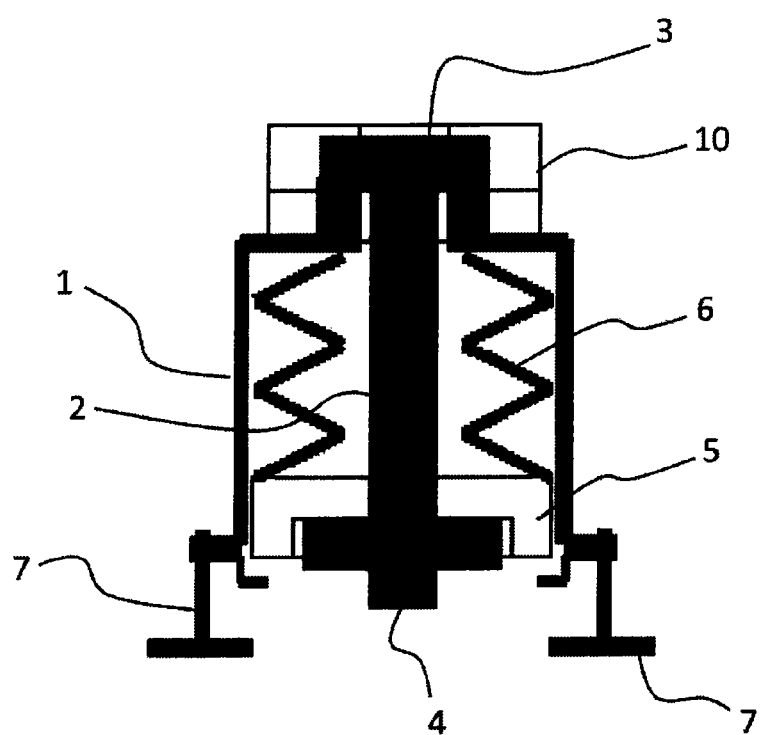
FIG. 1 is a view in cross section of a battery provided with a locking device suitable for implementation of the method for mounting or removing a battery according to the embodiment of the invention.

The method for removing a battery that supplies electric power to a motor vehicle according to the invention is connected with the principle via which such a battery is fixed, which is illustrated in FIG. 1 by way of example. A battery 1 is locked by a lock 2 which comprises a first end 3, collaborating with the body shell 10 of a motor vehicle which forms a latch fitting to perform the function of locking the battery, and a second end 4, comprising a connecting means intended for actuating the lock 2. The lock 2 is mounted so that it can turn on the battery, so that it can perform its locking or unlocking function. The battery further comprises a piston 5 acting on the lock 2 via an elastic element 6, such as a spring, in order to keep the lock 2 securely in the locked position.

More generally, the method of removing the battery, which will be described hereinafter, is suited to any principle of fixing a battery of the previous type that combines a turning lock associated with a device for placing the lock under load.

Figure 2:
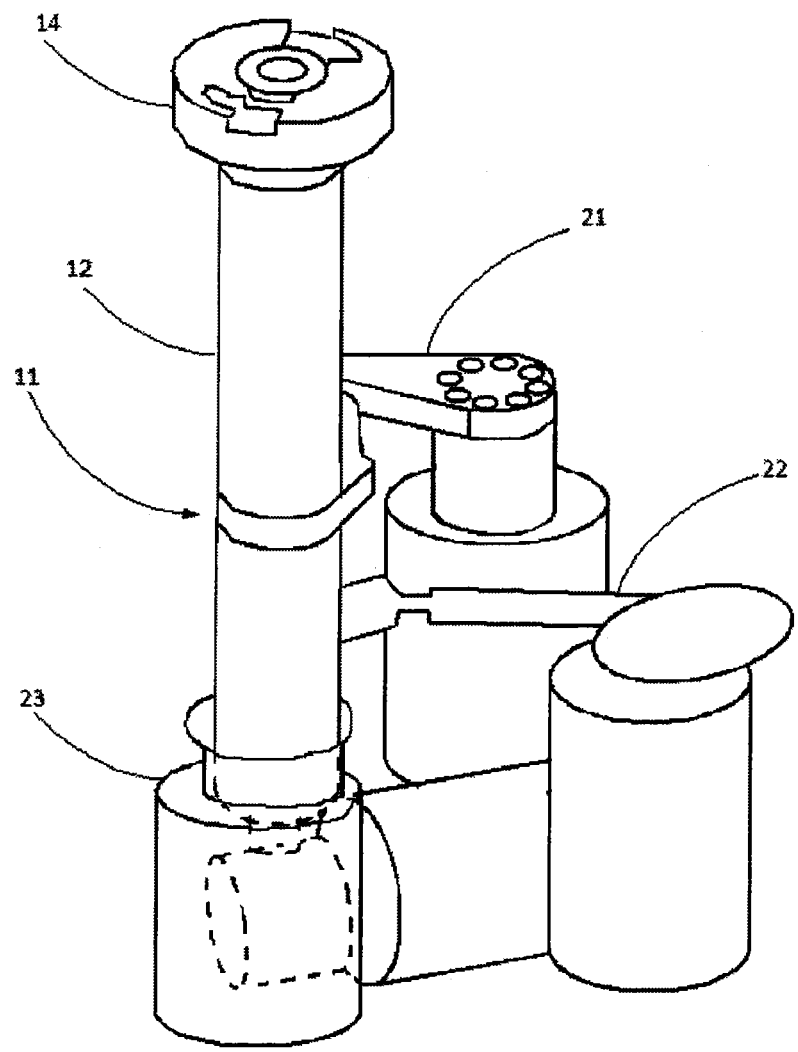
FIG. 2 is a perspective view from above of a tool that can be used to implement the method for mounting or removing a battery according to the embodiment of the invention.

The method of removing the battery 1 is implemented using a tool 11, for example as depicted in FIG. 2, which will be described later on. It comprises the following two essential steps, performed automatically by the tool 11:

E1: action on the piston 5 to cause a relative movement of the piston 5 with respect to the lock 2 in order to disengage the latter;

E2: rotation of the lock 2 to allow the lock to come out of the latch fitting and unlock it.

The first step E1 may simply consist in pushing the piston 5 in order to move it translationally against the force of the elastic means 6. The second step E2 may consist in turning the lock through one quarter of a turn, or in turning it through half a turn or less.

The method may comprise a prior step E0 of fixing the tool 11 to corresponding fixing elements 7 at the vehicle body shell, the battery or, more specifically, the lock, in order to ensure that it is correctly positioned with respect to the battery 1 and notably its locking system before the removal method described above is implemented reliably and well.

The fixing elements 7 of the tool 11 may take the form of mushrooms, which will preferably be arranged in such a way as to be accessible, of a shape that is easy to clean, resistant to the high stresses applied to them and which are not excessively bulky. Advantageously, two mushrooms are distributed symmetrically about the lock, in order to hold the tool stable. As an alternative, any other number of mushrooms and any shape of fixing elements 7 are acceptable without departing from the concept of the invention.

The tool can be fixed to the mushrooms by two types of movement: either through a translational movement or through a rotation in the plane of the mushrooms.

Finally, the removal method comprises one last step E4 of withdrawing the unlocked battery. To do that, the tool 11 may simply be returned in a translational movement in order to withdraw it and, at the same time, the battery.

These steps of the method for removing the battery are therefore performed via movements of a tool 11 which can be carried out in various ways, using independent actuators of the electrical, hydraulic type, using cam-operated dynamics, etc. FIG. 2 illustrates one embodiment of a tool 11 capable of automatically carrying out the method of removing a battery according to the invention.

Figure 3:
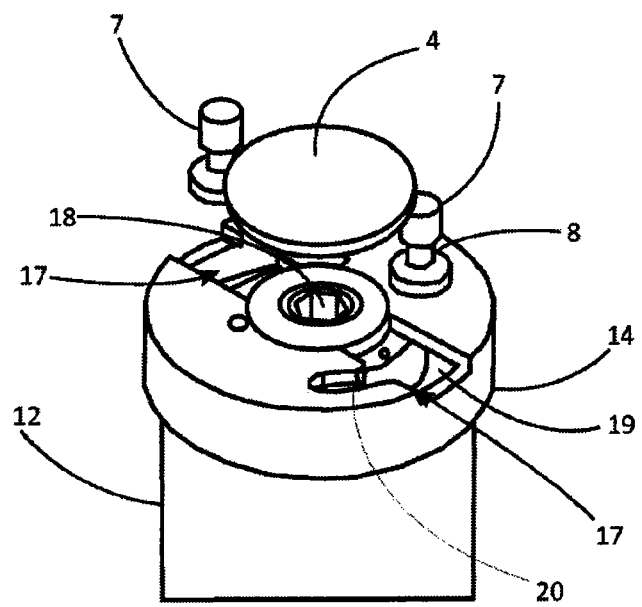
FIG. 3 is a perspective view from above of a detail of how the battery and the tool collaborate with one another to implement the method for mounting or removing a battery according to the embodiment of the invention.

The tool 11 comprises an upper end 14 mounted on a cylindrical vertical rod (spindle 12) intended to collaborate with the connecting part of the lock 2. This collaboration is illustrated more specifically in FIG. 3, in a phase during which the tool 11 is nearing the lock 2, of which only the lower connecting part 2 and the two mushroom-shaped lateral connecting elements (fixing elements 7) are depicted. The end 14 of the tool 11 comprises two slots 17 positioned symmetrically about a connecting element 18 which is in the form of a mortise capable of accepting a corresponding rod of flat type, not depicted, positioned under the surface of the connecting element 4 of the lock 2. Each slot has a substantially circular part 19 of substantial size, corresponding to a mushroom of fixing element 7, so that such a mushroom can be inserted via this circular part 19. Following on from that, each slot 17 comprises a narrower part 20 forming a portion of a circular arc, within which the narrower part 8 of a mushroom can move after it has been inserted through the opening 19. Thus, during the step E0 of fixing the tool 11, the openings 19 are brought closer to the mushrooms of fixing elements 7 until the latter become inserted in these openings, before the spindle 12 that locks the tool 11 in position via the mushrooms of fixing elements 7 is rotated. As an alternative, this fixing could be obtained using a different geometry and/or different movements, such as a translational movement. Thereafter, the central part of the spindle 12 moves in a vertical translational movement to come to rest against the piston 5 and disengage the lock, according to step E1. Finally, rotation of the connecting element 18 turns the lock to unlock it, according to step E2.

In order to obtain these various movements, the tool 11 has three independent motors, for example electric or pneumatic or hydraulic motors, an upper link rod 21 for fixing the tool to the mushrooms, a lower link rod 22 for turning the central part of the spindle 12 to unlock the lock, and a device 23 for causing the translational movement of the spindle 12. Note that these two movements may be coupled.

The invention claimed is:

1. A method for mounting or removing a container of energy that powers an engine or motor that propels a motor vehicle, fixed to the motor vehicle using a lock, the lock including a first end, a second end opposite to the first end, and a shaft connecting the first end and the second end, and a piston that is movable along the shaft and biased against the first end of the lock by an elastic element, the method comprising:
   (a) acting on the piston to cause the piston to compress the elastic element positioned within the container of energy, the acting on the piston moves the piston away from a first end of the lock to disengage the lock from the piston; and
   (b) after the acting on the piston, turning the lock to lock or unlock the lock that fixes the container of energy to the motor vehicle,
   wherein the piston is positioned between the first end of the lock and the elastic element, and
   wherein the piston is coaxial with and surrounds the shaft.

2. The method for mounting or removing a power supply energy container as claimed in claim 1, wherein the (a) acting comprises pushing the piston to move the piston translationally against the elastic element.

3. The method for mounting or removing a power supply energy container as claimed in claim 1, wherein the (b) turning comprises rotating the lock by half a turn or less.

4. The method for mounting or removing a power supply energy container as claimed in claim 3, wherein the (b) turning is obtained by associating a connecting means of a tool with a connecting means of the lock.

5. The method for mounting or removing a power supply energy container as claimed in claim 1, further comprising fixing a tool for implementing the method to at least one corresponding element of a body shell of the vehicle, of the container of energy, or of the lock, prior to the (a) acting.

6. The method for mounting or removing a power supply energy container as claimed in claim 5, wherein the fixing a tool includes connecting the tool via at least two connecting elements that are distributed symmetrically about a connecting means of the lock.

7. The method for mounting or removing a power supply energy container as claimed in claim 5, wherein the fixing a tool includes inserting a mushroom-shaped element extending from the container of energy into a corresponding slot in the tool.

8. The method for mounting or removing a power supply energy container as claimed in claim 1, wherein the (a) acting and the (b) turning are performed automatically using a motorized tool.

9. The method for mounting or removing a power supply energy container as claimed in claim 1, wherein the elastic element is a spring.

10. The method for mounting or removing a power supply energy container as claimed in claim 1, further comprising:
   after the turning the lock to unlock the lock, removing the container of energy from the motor vehicle.

11. The method for mounting or removing a power supply energy container as claimed in claim 10, further comprising:
   after the removing the container of energy from the motor vehicle, mounting a new container of energy to the motor vehicle.

12. The method for mounting or removing a power supply energy container as claimed in claim 1, wherein the container of energy is a battery.

13. The method for mounting or removing a power supply energy container as claimed in claim 12, wherein the piston is positioned within the battery.

14. The method for mounting or removing a power supply energy container as claimed in claim 13, wherein a first end of the elastic element contacts the piston and a second end of the elastic element contacts the battery.

15. The method for mounting or removing a power supply energy container as claimed in claim 1, wherein the (a) acting on the piston includes compressing the elastic element towards the motor vehicle.

\* \* \* \* \*